(12) United States Patent
Olson et al.

(10) Patent No.: US 11,038,753 B1
(45) Date of Patent: Jun. 15, 2021

(54) SYSTEMS AND METHODS TO SUPPORT FIRMWARE OVER-THE-AIR EVENTS BASED ON SERVICE LEVEL AGREEMENT

(71) Applicant: Verizon Patent and Licensing Inc., Arlington, VA (US)

(72) Inventors: Brian Olson, Clayton, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/736,053

(22) Filed: Jan. 7, 2020

(51) Int. Cl.
*H04L 12/24* (2006.01)

(52) U.S. Cl.
CPC ........ *H04L 41/082* (2013.01); *H04L 41/5019* (2013.01); *H04L 41/5067* (2013.01)

(58) Field of Classification Search
None
See application file for complete search history.

(56) References Cited

U.S. PATENT DOCUMENTS

| 2017/0374668 | A1* | 12/2017 | Tran | H04L 41/082 |
| 2018/0063700 | A1* | 3/2018 | Chandrasekaran | H04L 67/14 |
| 2019/0379763 | A1* | 12/2019 | Wirtanen | H04W 4/44 |

* cited by examiner

*Primary Examiner* — Cai Y Chen (57) ABSTRACT

A computer device receives user parameters for an Over-The-Air (OTA) update campaign. The parameters include a number of user equipment (UE) devices to receive an OTA update, a device type to receive the OTA update, a file size of an OTA update file, and a service level agreement parameter for the OTA update campaign. The computer device generates an estimate for conducting the OTA update campaign based on the user parameters and predicted network conditions, provides the estimate to a user, and receives a request for conducting the OTA update campaign using the user parameters. The request includes identifiers for the UE devices and the OTA update file. The computer device generates, based on the request, a schedule to perform the OTA update on the UE devices in accordance with the service level agreement parameter, and instructs the UE devices to perform the OTA update based on the schedule.

20 Claims, 7 Drawing Sheets

SYSTEMS AND METHODS TO SUPPORT FIRMWARE OVER-THE-AIR EVENTS BASED ON SERVICE LEVEL AGREEMENT

BACKGROUND INFORMATION

To satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services under various types of conditions. Managing a large number of devices may pose various challenges.

DETAILED DESCRIPTION OF PREFERRED EMBODIMENTS

The following detailed description refers to the accompanying drawings. The same reference numbers in different drawings identify the same or similar elements.

Wireless networks, such as Public Land Mobile Networks (PLMNs), were traditionally designed to support mobile devices operated by users. An increasing number of Internet of Things (IoT) applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to high velocity autonomous vehicles and aerial drones.

Uses of IoT devices are increasing rapidly and may result in a large number of such devices being serviced by a wireless access network. In many applications, the data sent or received by IoT devices may be small compared to other types of devices, such as mobile phones used for voice communication or for streaming content. Furthermore, many IoT devices are designed for low power applications and long battery life. Using large bandwidth channels that require large amounts of power, such as a Fourth Generation (4G) Long Term Evolution (LTE) access network channel, for wirelessly communicating with IoT device may result in an inefficient allocation and use of radio link resources.

However, sometimes, a large number of IoT devices on the same network, or even attached to the same base station, may need to receive a large amount of data within a short time period. As a notable example, an entity managing a group of IoT device may need to perform a wireless update, also referred to as an Over-The-Air (OTA) update. One particular type of OTA update that may include the transfer of a large file is a Firmware OTA (FOTA) update. Other types of OTA updates that may include the transfer of a large file may be a baseband OTA update or an application software OTA update. The firmware of an IoT device may control the low-level operation of the hardware of an IoT device and may need to be periodically upgraded. When an original equipment manufacturer (OEM), an enterprise, or another type of entity managing a large group of IoT devices, decides to add a new functionality to, or fix a potential security flaw in, a large group of IoT devices, the resources of a wireless access network may be temporarily insufficient to meet the update bandwidth requirements.

Implementations described herein relate to Public Land Mobile Network (PLMN) scheduling control of device FOTA events. FOTA events may be managed by the wireless network to meet customer service requirements while minimizing the network impact of bulk update scenarios in concentrated geographic areas. A FOTA platform may solicit service level parameters from customers, such as OEM or enterprise customers, for a FOTA campaign. The parameters may include a number of user equipment (UE) devices to receive an OTA update, a device type to receive the OTA update, a file size of an OTA update file, and a service level agreement parameter for the OTA update campaign. A FOTA system for the FOTA platform may generate an estimate for conducting the OTA update campaign based on the user parameters and predicted network conditions, provide the estimate to a user, and receive a request for conducting the OTA update campaign using the user parameters. The request may include identifiers for the UE devices and the OTA update file. The FOTA system may generate, based on the request, a schedule to perform the OTA update on the UE devices in accordance with the service level agreement parameter, and instruct the UE devices to perform the OTA update based on the schedule.

Figure 1:
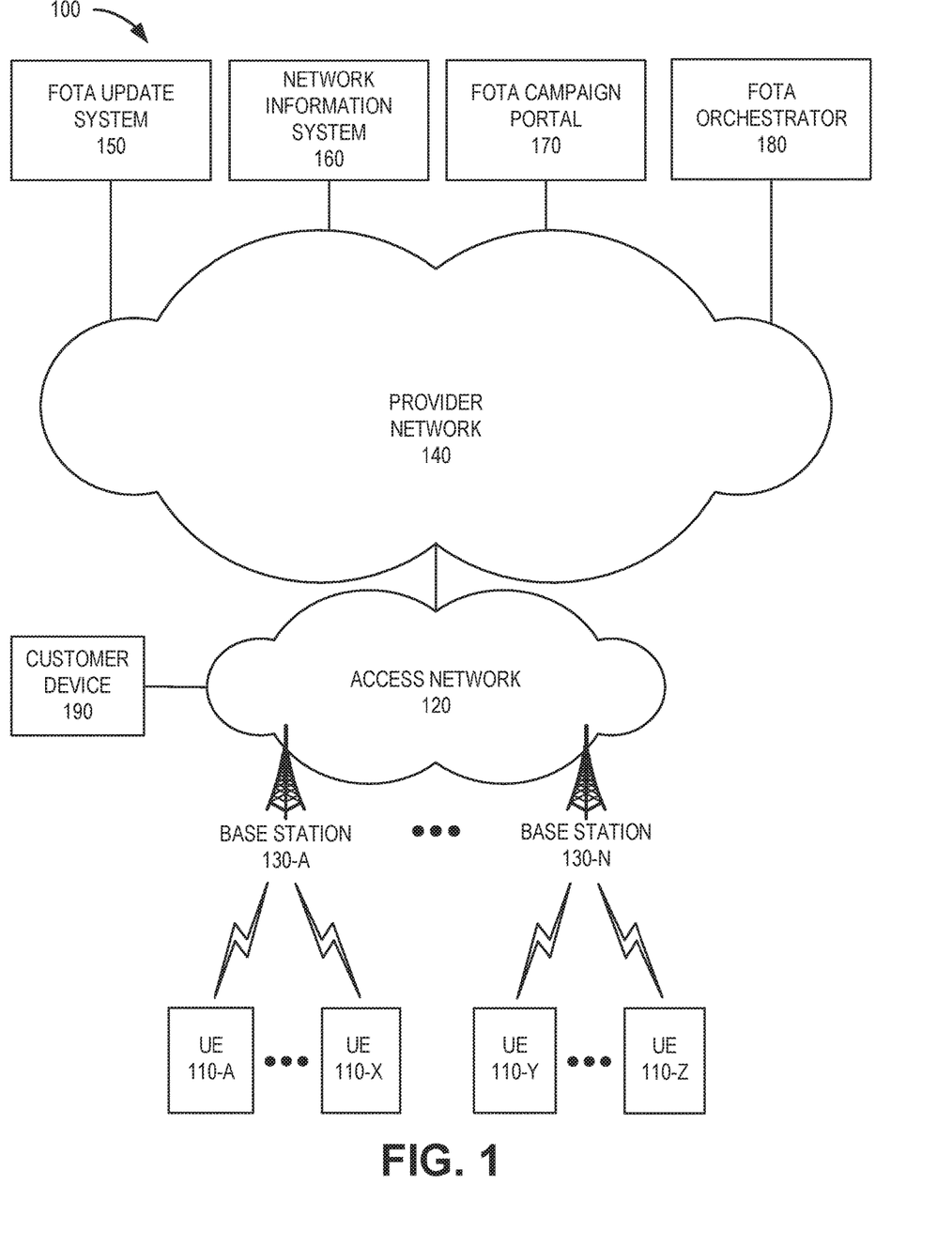
FIG. 1 is a diagram illustrating an environment according to an implementation described herein.

FIG. 1 illustrates an exemplary network environment 100 in which the systems and/or methods, described herein, may be implemented. As shown in FIG. 1, network environment 100 may include user equipment (UE) devices 110-A to 110-Z (referred to herein collectively as "UE devices 110" and individually as "UE device 110"), an access network 120, a provider network 140, a FOTA update system 150, a network information system 160, an FOTA campaign portal 170, a FOTA orchestrator 180, and a customer device 190.

UE device 110 may include any device with long-range (e.g., cellular or mobile wireless network) wireless communication functionality. For example, UE device 110 may communicate using M2M communication, such as MTC. According to some implementations, UE device 110 may be a Category M1 (CAT-M1) IoT device or a Narrow Band (NB) IoT (NB-IoT) device. UE device 110 may use CAT-M1 channels, also sometimes referred to as enhanced MTC (eMTC) channels, or the Narrow Band (NB) IoT (NB-IoT) technology for M2M communications. In other implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., APPLE TV, GOOGLE CHROMECAST, AMAZON FIRE TV, etc.), a WiFi access point, a smart television, etc.; a portable gaming system; a global positioning system (GPS) device; a home appliance device; a home monitoring device; and/or any other type of computer device with wireless communication capabilities and/or a user interface.

Access network 120 may provide access to provider network 140 for UE devices 110. Access network 120 may enable UE device 110 to connect to provider network 140 for Internet access, mobile telephone service, Short Message Service (SMS) message service, Multimedia Message Service (MMS) message service, cloud computing, and/or other types of data services.

Access network 120 may establish a packet data network connection between UE device 110 and provider network 140 via one or more Access Points (APs). For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140 through a gateway, such as, for example, Data over Non-Access Stratum (DoNAS) communication method.

In some implementations, access network 120 may include a Long-Term Evolution (LTE) access network. In other implementations, access network 120 may include a Code Division Multiple Access (CDMA) access network. For example, the CDMA access network may include a CDMA enhanced High Rate Packet Data (eHRPD) access network (which may provide access to an LTE access network). Furthermore, access network 120 may include an LTE Advanced (LTE-A) access network and/or a 5G access network or other advanced access network that includes functionality such as 5G New Radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as CAT-M1 and/or NB-IoT technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UE devices 110. For example, base station 130-A may service UE devices 110-A to 110-X, etc., and base station 130-N may service UE devices 110-Y to 110-Z. In other words, UE devices 110-A to 110-X may be located within the geographic area serviced by base station 130-A, and other UE devices 110-Y to 110-Z may be serviced by another base station 130-N. Base station 130 may include a 4G LTE base station (e.g., an eNodeB) and/or a Fifth Generation (5G) New Radio (NR) base station (e.g., a gNodeB). Base station 130 may include one or more RF antennas facing particular directions. For example, base station 130 may include three RF transceivers and each RF transceiver may service a 120° sector of a 360° field of view.

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a communication service provider that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

According to one implementation, provider network 140 may include LTE Evolved Packet Core (EPC) network elements, such as a Mobility Management Entity (MME), a Serving Gateway (SGW), a Packet Data Network Gateway (PGW), a Home Subscriber Server (HSS), a Policy and Charging Rules Function (PCRF), and/or other EPC network elements. In other implementations, provider network 140 may include a 5G Standalone (SA) architecture that includes 5G network functions such as an Access and Mobility Function (AMF), a User Plane Function (UPF), a Session Management Function (SMF), an Application Function (AF), a Unified Data Management (UDM), a Policy Control Function (PCF), a Network Repository Function (NRF), a Network Exposure Function (NEF), a Network Slice Selection Function (NSSF), and/or other 5G SA network elements. Furthermore, the 5G SA network may be configured to implement network slicing.

FOTA update system 150 may include one or more computer devices, such as server devices, which are configured to provide FOTA updates, and/or other types of updates to IoT devices, such as UE devices 110. For example, FOTA update system 150 may receive an update (e.g., one or more update files) from FOTA orchestrator 180 and may provide the update to UE device 110 in response to UE device 110 sending a message requesting the update to FOTA update system 150.

Network information system 160 may include one or more computer devices, such as server devices, which receive traffic and diagnostic data from network elements in access network 120 and/or provider network 140. The received traffic and diagnostic data may be analyzed to generate traffic distribution data which may define patterns to characterize data and control flows within the network, and provide qualitative and/or quantitative information regarding each network element (e.g., base stations 130) in the wireless network. For example, network information system 160 may maintain information relating to the network capacity associated with particular base stations 130, such as the number of FOTA updates a particular base station 130 is able to handle at a particular time. When a certain capacity threshold is reached on a physical resource, network information system 160 may notify FOTA orchestrator 180. According to another implementation, network information system 160 may also monitor traffic to ensure FOTA downloads (e.g., from a base station 130 to UE 110) do not limit needed capacity (e.g., for other types of traffic) in the network.

In another implementation, network information system 160 may also use artificial intelligence or analytical resources to predict and/or notify FOTA orchestrator 180 of capacity choke points and high consumption periods for a resource (e.g., base station 130) to be used for FOTA targets. In still another implementation, network information system 160 may also identify a best cell or multiple cells to meet a given FOTA use case by utilizing data mined from real world results and/or various trials. In another implementation, network information system 160 may query and/or include a network exposure function (NEF) or a Service Capability Exposure Function (SCEF) to determine the optimum/expected time to reach low power UEs during Power Saving Mode (PSM) or other configured sleep periods.

FOTA campaign portal 170 may include one or more computer devices, such as server devices, which are configured to solicit FOTA campaign information, from a customer, to assemble a FOTA campaign. As described further herein, the FOTA campaign information may identify campaign timing, a service priority level, the file size associated with the FOTA update, and the UE devices 110 that are to receive the FOTA update. According to an implementation, FOTA campaign portal 170 may include a web-based interface to solicit structured input from a customer.

FOTA orchestrator 180 may include one or more computer devices, such as server devices, which are configured to orchestrate a FOTA update associated with a FOTA update campaign and/or another type of OTA update. For example, FOTA orchestrator 180 may receive a request to perform a FOTA update campaign from FOTA campaign portal 170, may receive or generate actual/predictive network capacity information relating to base stations 130 from network information system 160, and may orchestrate a FOTA update campaign based on the received request and the received network capacity information. FOTA orchestrator 180 may signal UE devices 110 to request a FOTA update within the scheduled periods. According to one implementation, FOTA orchestrator may instruct UE devices to perform a FOTA update via a multicast message.

Customer device 190 may include any type of computing or communication device to provide user input to FOTA campaign portal 170. Customer device 190 may include, for example, a personal computer or workstation, a server device, a portable computer, a mobile device, etc. According to an implementation, customer device 190 may access FOTA campaign portal 170 via a portal or secure web interface. Customer device 190 may be used, for example, to provide customer parameters for a FOTA campaign.

Although FIG. 1 shows exemplary components of network environment 100, in other implementations, network environment 100 may include fewer components, different components, differently arranged components, or additional functional components than depicted in FIG. 1. Additionally, or alternatively, one or more components of network environment 100 may perform functions described as being performed by one or more other components of network environment 100.

Figure 2:
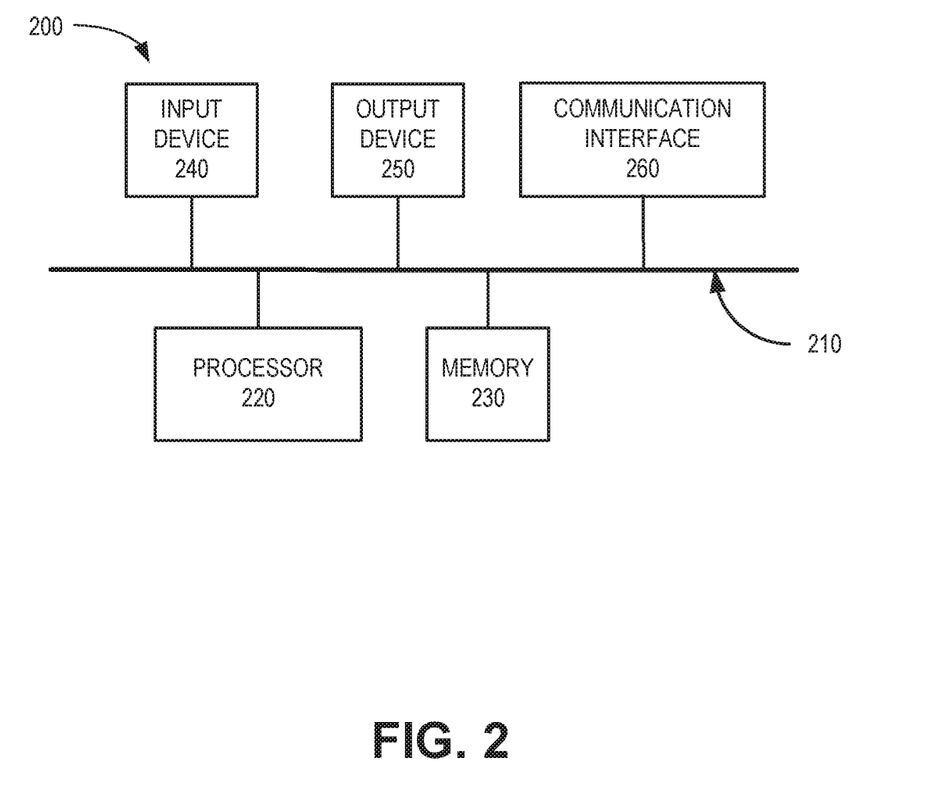
FIG. 2 is a diagram illustrating exemplary components of a device that may be included in a component of FIG. 1 according to an implementation described herein.

FIG. 2 is a diagram illustrating example components of a device 200 according to an implementation described herein. UE device 110, base station 130, FOTA update system 150, network information system 160, FOTA campaign portal 170, and FOTA orchestrator 180 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing components) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240.

Output device 250 may output information to an operator of device 200. Output device 250 may include a display, a printer, a speaker, and/or another type of output device. For example, output device 250 may include a display, which may include a liquid-crystal display (LCD) for displaying content to the customer. In some embodiments, device 200 may be managed remotely and may not include output device 250.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio frequency identification (RFID) interface, a near-field communications (NFC) wireless interface, and/or any other type of interface that converts data from one form to another form.

As will be described in detail below, device 200 may perform certain operations relating to orchestrating a FOTA campaign. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
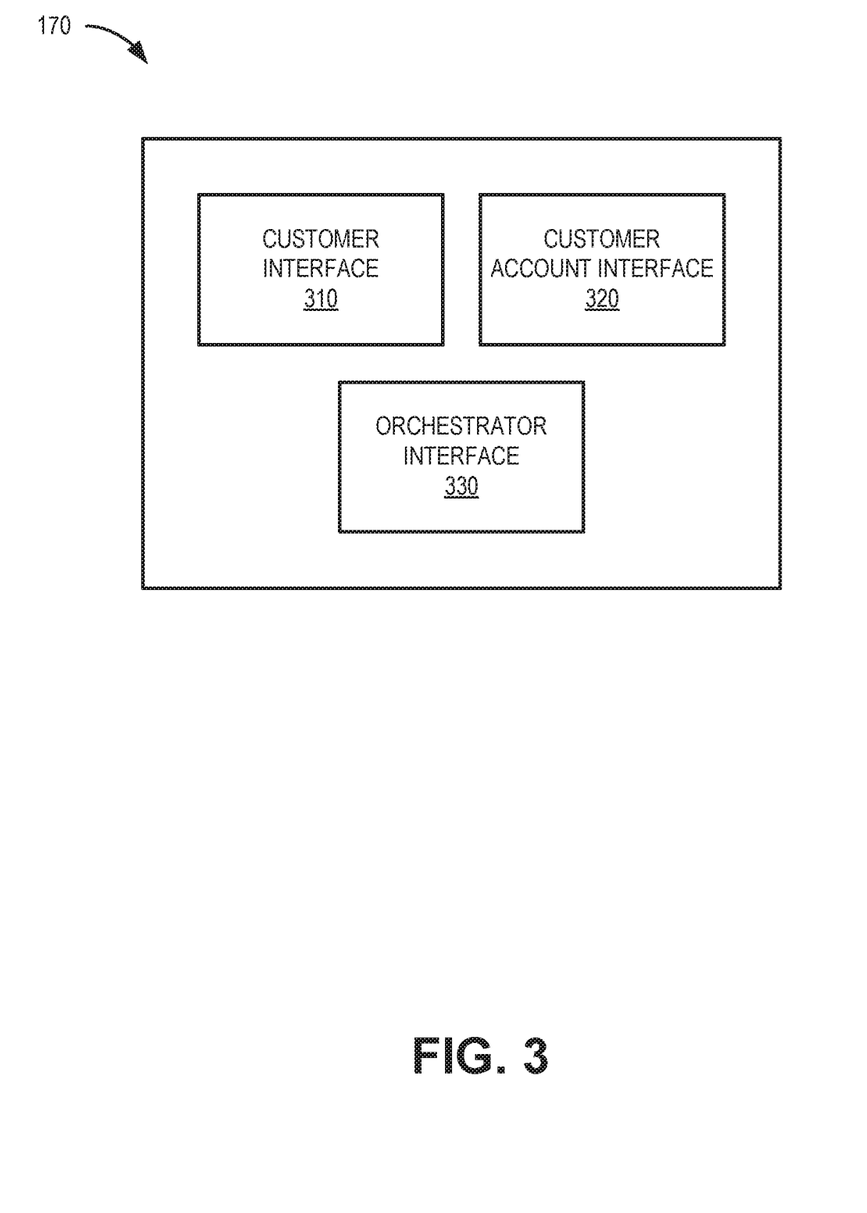
FIG. 3 is a diagram illustrating exemplary components of the Firmware Over-The-Air (FOTA) campaign portal of FIG. 1 according to an implementation described herein.

FIG. 3 is a block diagram illustrating exemplary components of FOTA campaign portal 170. The components of FOTA orchestrator 180 may be implemented, for example, via processor 220 executing instructions from memory 230. Alternatively, some or all of the functional components of FOTA orchestrator 180 may be implemented via hard-wired circuitry. As shown in FIG. 3, FOTA campaign portal 170 may include a customer interface 310, a customer account interface 320, and an orchestrator interface 330.

Customer interface 310 may provide a user interface, for presentation on customer device 190, to solicit structured user input for a FOTA campaign. Customer interface 310 may facilitate submission and/or retrieval of customer criteria for FOTA updates of customer IoT devices (e.g., UE devices 110). According to an implementation, a user may provide login credentials to access customer interface 310, which may use customer account information associated with the customer login to facilitate selections of user options presented on customer interface 310. Customer interface 310 is described further in connection with, for example, FIG. 5.

Customer account interface 320 may access customer information associated with a customer's UE devices 110. For example, after a customer has logged in via customer interface 310, customer account interface 320 may retrieve customer device information to facilitate user input. Customer device information may include, for example, the number and type of UE devices 110 associated with a customer account (e.g., that are potential candidates for a FOTA upgrade). Customer device information may also include communication settings, such as sleep windows, battery limitations, communication types, etc., associated with each UE device 110. Customer account interface 320 may provide customer device information to customer interface 310 for presentation (e.g., as a list or query response) and possible selection by a customer.

Orchestrator interface 330 may be configured to communicate with FOTA orchestrator 180. Orchestrator interface 330 may provide information collected by customer interface 310 to FOTA orchestrator 180 and provide responses from FOTA orchestrator 180 to customer interface 310 for presentation to a user.

Although FIG. 3 shows exemplary components of FOTA campaign portal 170, in other implementations, FOTA campaign portal 170 may include fewer components, different components, or additional components than depicted in FIG. 3. Additionally, or alternatively, one or more components of FOTA campaign portal 170 may perform functions described as being performed by one or more other components of FOTA campaign portal 170.

Figure 4A:
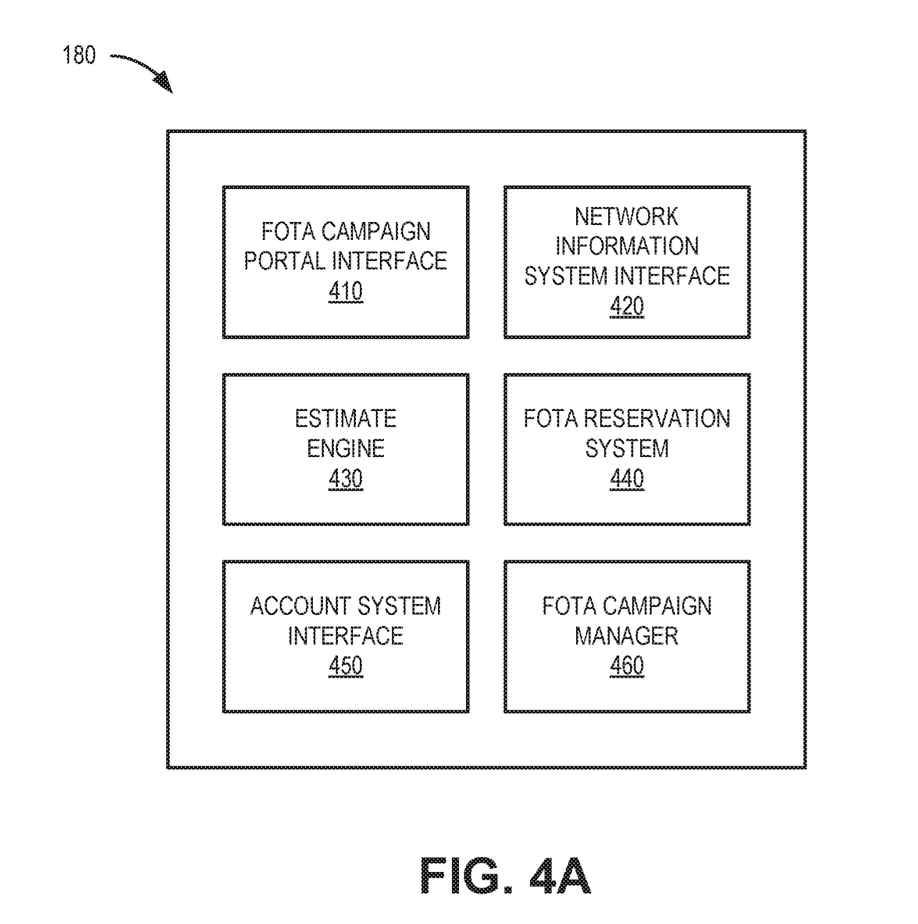
FIG. 4A is a diagram illustrating exemplary components of the FOTA orchestrator of FIG. 1 according to an implementation described herein.

FIG. 4A is a block diagram illustrating exemplary components of FOTA orchestrator 180. The components of FOTA orchestrator 180 may be implemented, for example, via processor 220 executing instructions from memory 230. Alternatively, some or all of the functional components of FOTA orchestrator 180 may be implemented via hard-wired circuitry. As shown in FIG. 4A, FOTA orchestrator 180 may include a FOTA campaign portal interface 410, a network information system interface 420, an estimate engine 430, a FOTA reservation system 440, an account system interface 450, and FOTA campaign tracker 460.

FOTA campaign portal interface 410 may be configured to communicate with FOTA campaign portal 170. For example, FOTA campaign portal interface 410 may receive user settings for a proposed FOTA campaign and provide estimates and scheduling confirmations to FOTA campaign portal interface 410.

Network information system interface 420 may be configured to communicate with network information system 160. For example, network information system interface 420 may obtain information relating to network capacity and off-peak usage times of base stations 130 from network information system 160.

Estimate engine 430 may be configured to receive customer input from FOTA campaign portal 170 (e.g., customer interface 310) and network information from network information system interface 420. Using this information, estimate engine 430 may provide an initial assessment of whether a FOTA campaign with the proposed parameters is viable (e.g., feasible) under the given time constraints, service level, magnitude of effort (e.g., number of devices and file size), projected network loads, UE device 110 sleep periods, radio resource performance, etc. If viable, estimate engine 430 may assemble an estimate for the FOTA campaign. According to an implementation, estimate engine 430 may provide dynamic pricing for a proposed FOTA campaign based on (1) a customer's configurable selections including, for example, a number of devices, device type, FOTA file size, time periods, priority level, geographic region, etc., and (2) current and projected network capacity.

FOTA reservation system 440 may be configured to track existing FOTA campaigns and network commitments. FOTA reservation system 440 may communicate with FOTA update system 150 and/or FOTA campaign manager 460 to monitor resource availability to support new FOTA campaigns. In an implementation, FOTA reservation system 440 may put a temporary reservation on network resources that would be needed to support customer estimates (generated by estimate engine 430). According to another implementation, FOTA reservation system 440 may also provide updates for an existing FOTA campaign status to a customer (e.g., via customer interface 310).

Account system interface 450 may provide customer selections from customer interface 310 to an account system (not shown) that may generate notices and/or invoices for a customer's selected FOTA campaign.

FOTA campaign manager 460 may orchestrate customers' FOTA update campaigns based on different campaign service level agreements (SLAs). For example, orchestrator manager 410 may prioritize and schedule FOTA updates based on schedules in FOTA reservation system 440. Orchestrator manager 460 may provide FOTA update files to FOTA update system 150, for FOTA update system 150 to update UE devices 110 (e.g., in response to UE device 110 sending a message to FOTA update system 150 requesting the update).

Figure 4B:
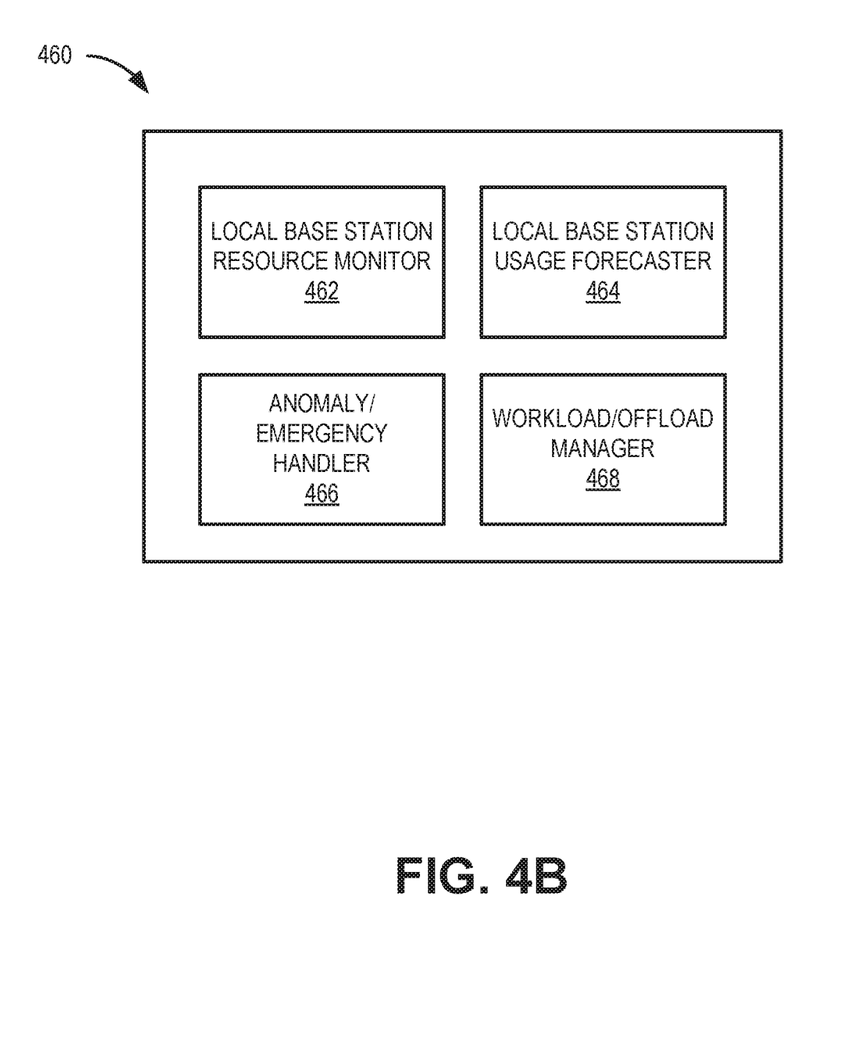
FIG. 4B is a diagram illustrating exemplary components of the FOTA campaign manager of FIG. 4A according to an implementation described herein.

FIG. 4B is a block diagram illustrating exemplary components of FOTA campaign manager 460. As shown in FIG. 4B, FOTA orchestrator 180 may include a local base station resource monitor 462, a local base station usage forecaster 464, an anomaly/emergency handler 466, and a workload/offload manager 468.

Local base station resource monitor 462 may monitor the resource usage and performance of each respective base station 130 associated with a FOTA campaign (e.g., based on a region for the campaign, a home base station designation for UE devices included in the campaign, or another designation). Radio resource usage may include, for example, bandwidth usage, RAM usage, storage usage, CPU usage, etc., by a base station 130. Radio resource performance may include, for example, measured Received Signal Strength Indication (RSSI), channel quality indicator (CQI), a signal-to-interference-plus-noise ratio (SINR) value, etc. In a distributed arrangement, resource usage and performance may be monitored and reported to other local base station resource monitors 462 (e.g., respective FOTA campaign managers 460).

Local base station usage forecaster 464 may be used to predict/forecast base station use in the future, such as a period of the next few hours, days, weeks, etc., for an individual base station 130. Local base station usage forecaster 464 may provide forecasts for bandwidth usage, RAM usage, storage usage, CPU usage, etc. According to one implementation, local base station usage forecaster 464 may distribute forecasts to other FOTA campaign manager 460 in a distributed system through periodic messages or responses to requests. According to one implementation, local base station usage forecaster 464 may locally apply artificial intelligence (AI), such as machine learning (ML) or deep learning (DL), to forecast base station resource usage. The algorithms and models used may be the same for each base station 130 or different for differently-purposed or different types of base stations 130. Data used in AI may be shared across different FOTA campaign managers 460 in a distributed environment. A computations may be used for analytics on resource usage at one base station 130, on an individual application instance, on service for an area serviced by multiple base stations 130.

Emergency handler 466 may be used to detect a local abnormality of resource usage and/or emergency situations in a local base station 130. When the resource usages of a local base station 130 reach a pre-defined criteria value, abnormality/emergency handler 466 may treat the situation as an abnormality or emergency. In one implementation, emergency handler 466 may rely on predictive forecasts from local base station usage forecaster 464 to detect an abnormality. An abnormality may include, for example, above- or below-normal resource use by a particular OTA activity or user that may not lead to an imminent service disruption. An emergency, in contrast, may include, for example, a network disruption or physical problem that impacts delivery or services.

Workload/offload manager 468 may consume analytics data from local base station resource monitor 462, local base station usage forecaster 464, and emergency handler 466. Generally, workload/offload manager 468 may schedule when and where FOTA events should best take place in network environment 100 to minimize or "flatten out" network traffic peaks (e.g., benefiting a network service provider) while meeting the SLA requirements of different FOTA campaigns (e.g., benefiting customers). Based on the analytics data, workload/offload manager 468 may make recommendations on when FOTA activities could be performed by a base station 130 and whether FOTA traffic could be better routed to other available base stations 130. For example, workload/offload manager 468 may store threshold values (e.g., as absolute values or percentage levels of different resources) that may be compared with current or forecasted analytics data to determine whether to off-load some FOTA traffic to different base station 130, if possible. According to another implementation, workload/offload manager 468 may seek to initiate a FOTA event when a UE device 110 is in a geographic area known to exhibit better cell performance (or at least performance above some minimum threshold), which could result in fewer required FOTA retries (e.g., fewer FOTA update failures). Maximizing first-try FOTA success may minimize network bandwidth use and minimize UE device battery use.

Although FIGS. 4A and 4B show exemplary components of FOTA orchestrator 180, in other implementations, FOTA orchestrator 180 may include fewer components, different components, or additional components than depicted in FIGS. 4A and 4B. Additionally, or alternatively, one or more components of FOTA orchestrator 180 may perform functions described as being performed by one or more other components of FOTA orchestrator 180.

Figure 5:
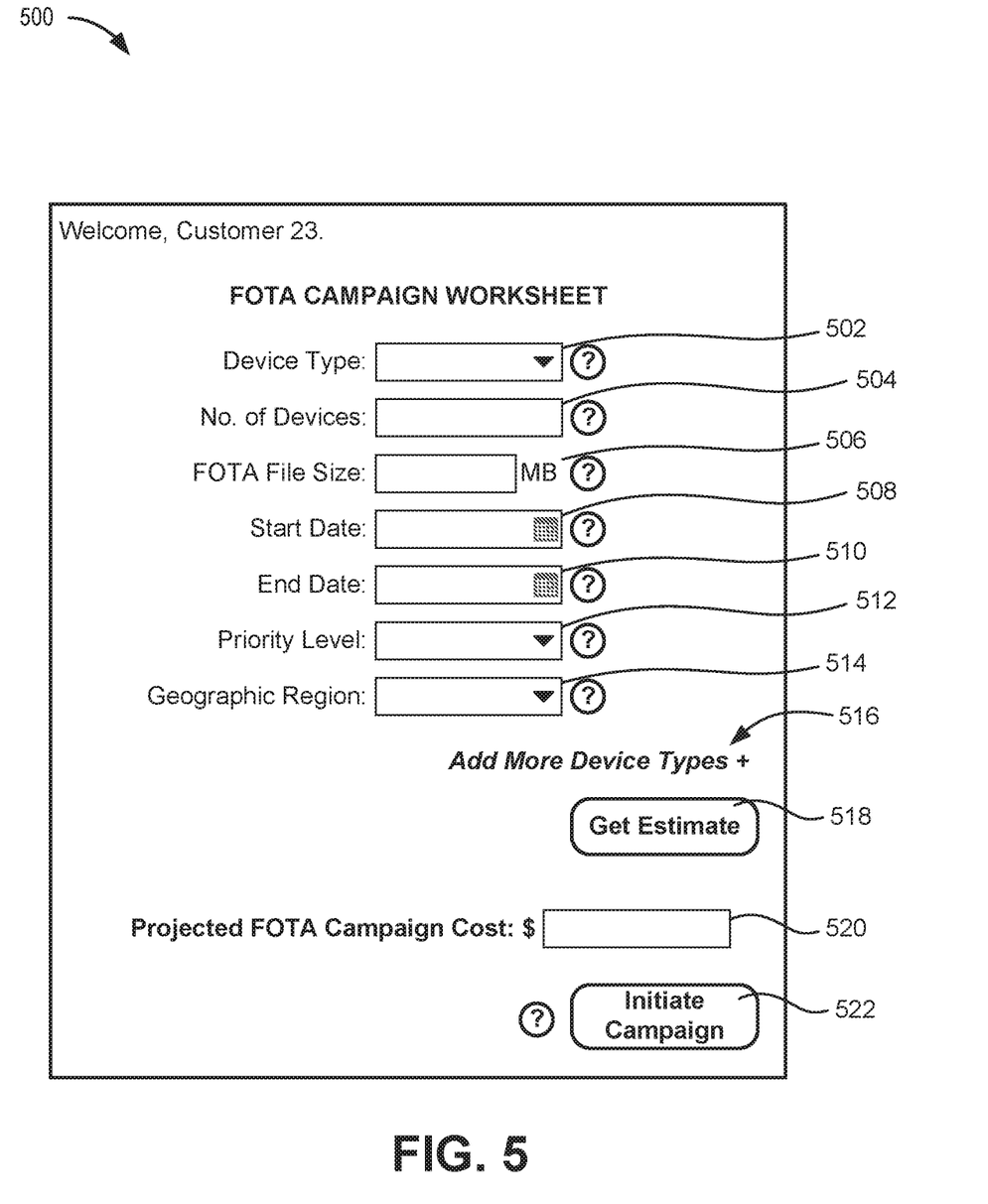
FIG. 5 is a diagram of an exemplary user interface that is capable of being generated by FOTA campaign portal of FIG. 1.

FIG. 5 depicts a diagram of an exemplary user interface 500 that is capable of being generated by FOTA campaign portal 170 (e.g., customer interface 310). In the example of FIG. 5, user interface 500 may include a graphical user interface (GUI). In other implementation, user interface 500 may include a non-graphical user interface, such as a text-based interface. User interface 500 may be used to solicit user settings or preferences for a customer's FOTA campaign. As illustrated in FIG. 5, user interface 500 may include multiple fields to solicit features of a proposed FOTA campaign, including a device type field 502, a number of devices field 504, a FOTA file size field 506, a start date field 508, an end date field 510, a priority level field 512, and a geographic region field 514. In addition to the above user input fields, user interface 500 may also include an additional input selector 516, an estimate request button 518, an estimate field 520, and an initiate campaign button 522.

User interface 500 may provide default options for particular fields and/or customer-specific values based on customer account information (e.g., extracted via customer account interface 320). In some implementations, one or more fields of user interface 500 may include a selection mechanism, such as a radio button, a checkbox, a dropdown menu, etc. to allow a user of user interface 500 to select from one or more of a set of structured options available to the particular customer. Thus, while FIG. 5 provides one example of user interface 500, in other aspects, different fields and presentation formats may be included in user interface 500.

Device type field 502 may include a type of UE device 110 for which a FOTA upgrade is proposed. According to an implantation, user inputs for device type field 502 may be limited to selections corresponding to types of UE devices 110 associated with a customer's account. Number of devices field 504 may include the number of UE devices 110, associated with a customer, of the corresponding device type in device type field 502. According to an implantation, FOTA campaign portal 170 may provide a default value equal to the total number of UE devices 110 (of the corresponding device type) associated with a customer account. In other implementations. FOTA campaign portal 170 may restrict user entries to values that correspond to a number of applicable UE devices in a customer account.

FOTA file size field 506 may include a file size (e.g., in MB) of the software that will be downloaded to UE devices 110 for the FOTA campaign. Start date field 508 and end date field 510 may include date entry fields that define a desired FOTA campaign time window. According to another implementation, fields 508/510 may include a time of day windows or another recurring period.

Priority level field 512 may include a service level or quality of service indicator be applied for the FOTA campaign. For example, priority level field 512 may include options of one or more levels that correspond to guaranteed reliability, such as basic (99% reliable), silver (99.9% reliable), or gold (99.99% reliable). According to an implementation, the guaranteed reliability may be supported by rebates, discounts or free services for the customer if a FOTA campaign is not performed in accordance with accepted customer parameters.

Geographic region field 514 may list a particular geographic location to which the FOTA campaign may be limited. For example, geographic regions may include, for example, defined countries or regions within a country for the FOTA campaign. In another implementation, geographic region field 514 may include particular cities or zip codes.

According to an implementation, FOTA campaign portal 170 may cross-reference user input to fields 502-514 for consistency in real-time. For example, FOTA campaign portal 170 may prevent selection of a "silver" priority level for priority level field 512 when the selected dates in start date field 508 and end date field 510 would preclude that option.

As shown in FIG. 5, additional input selector 516 may allow a user to assemble a FOTA campaign with additional device types. Selection of additional input selector 516 may cause FOTA campaign portal 170 to present additional fields (e.g., similar to fields 502-514) in user interface 500.

Estimate request button 518 may allow a user to submit FOTA campaign criteria (e.g., as indicated in fields 502-514) for an estimate. Upon selection of estimate request button 518, FOTA campaign portal 170 may provide the FOTA campaign criteria to FOTA orchestrator 180 (e.g., estimate engine 430). Estimate engine 430 may assemble a pricing estimate for a FOTA campaign base on the FOTA campaign criteria and provide a value to FOTA campaign portal 170 for presentation in estimate field 520. Estimate engine 430 may also signal FOTA reservation system 440 to temporarily reserve network resources to support the FOTA campaign criteria.

A user may view the estimate in estimate field 520 and decide whether to proceed with campaign request (e.g., by selecting initiate campaign button 522) or to modify the FOTA campaign criteria in any of fields 502-514. For example, a user may choose to modify the service level in priority level field 512 or the time window of fields 508/510 and request a new estimate. As another example, a user may elect to modify a FOTA campaign by using a different FOTA file size in FOTA file size field 506. Thus, a user may change any of fields 502-514 and request a new estimate by selecting estimate request button 518.

Selecting initiate campaign button 522 may cause FOTA campaign portal 170 to submit a FOTA campaign request to FOTA orchestrator 180. According to one implementation, selection of initiate campaign button 522 may cause FOTA campaign portal 170 to provide another user interface (not shown) to provide/select identifiers for specific UE devices 110. For example, FOTA campaign portal 170 may require an International Mobile Equipment Identity (IMEI) ID, an Electronic Serial Number (ESN) ID, an International Mobile Subscriber Identity (IMSI) ID, a Mobile Directory Number (MDN) ID, a Mobile Station International Subscriber Directory Number (MSISDN) ID, a Globally Unique Temporary Identity (GUTI) ID, a Cell Radio Network Temporary Identity (CRTNI) ID, an IP address, a Media Access Control (MAC) address, an External ID, and/or another type of identifier associated with the particular UE device 110. Additionally, selection of initiate campaign button 522 may cause FOTA campaign portal 170 to provide an interface for the user to upload the FOTA upgrade file(s) required for the campaign. According to an implementation, FOTA campaign portal 170 and/or FOTA orchestrator 180 may confirm the FOTA upgrade file size is consistent with the value provided in FOTA file size field 506.

Figure 6:
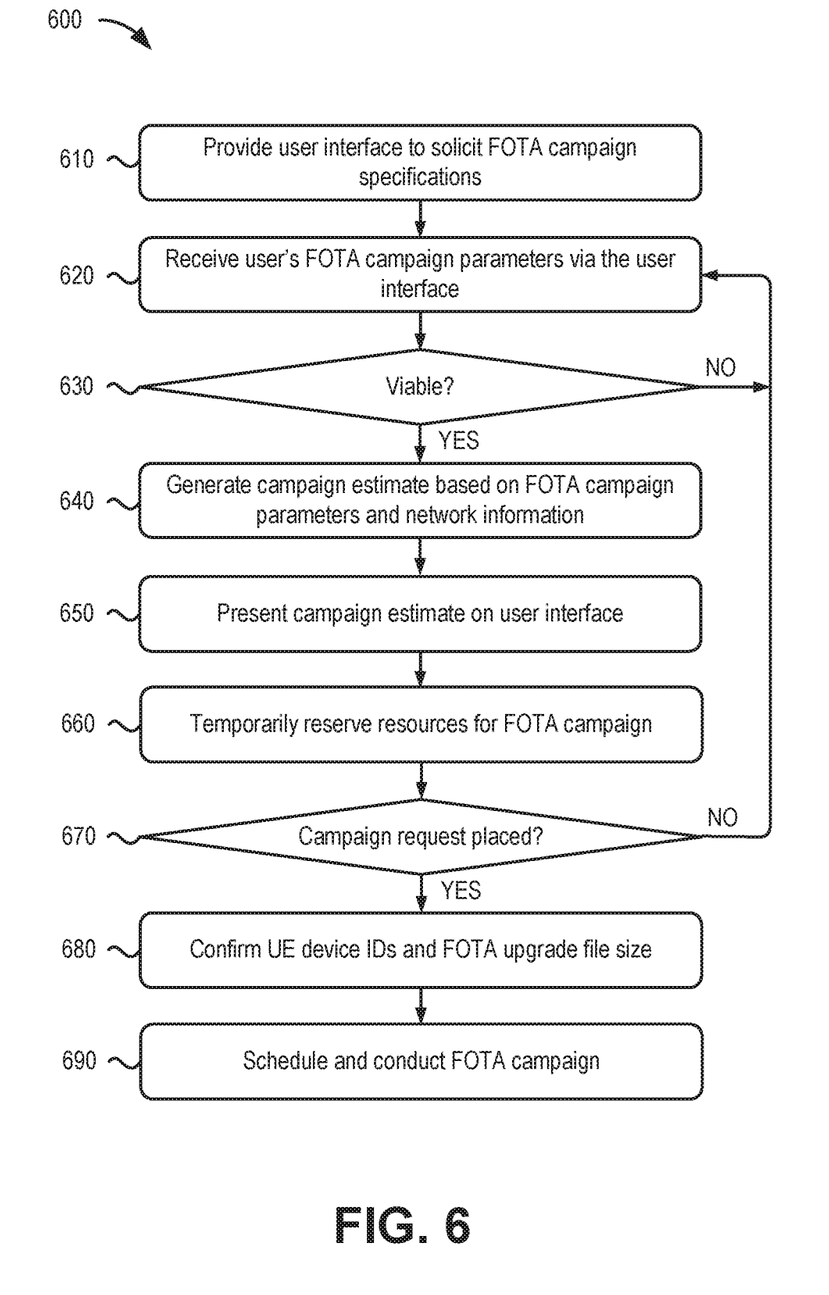
FIG. 6 is a flowchart of a process for executing a FOTA update campaign according to an implementation described herein.

FIG. 6 is a flowchart of a process 600 for executing a FOTA update campaign according to an implementation described herein. In some implementations, the process of FIG. 6 may be performed by FOTA campaign portal 170 and FOTA orchestrator 180. In other implementations, some or all of the process of FIG. 6 may be performed by another device or a group of devices in conjunction with FOTA campaign portal 170 and/or FOTA orchestrator 180.

Process 600 may include providing a user interface to solicit FOTA campaign parameters (block 610) and receiving a user's FOTA campaign parameters via the user interface (block 620). For example, a user may provide login information to access FOTA campaign portal 170. FOTA campaign portal 170 may present a user interface (e.g., user interface 500) on customer device 190 to solicit parameters for a FOTA campaign. The campaign parameters may include, for example, a campaign timeframe, a service priority level, and a file size associated with the FOTA update.

Process 600 may also include determining if the campaign parameters are viable (block 630). For example, FOTA orchestrator 180 (e.g., estimate engine 430) may receive customer parameters from FOTA campaign portal 170 (e.g., customer interface 310), retrieve network information from network information system interface 420, and/or generate predictive network information based on actual information from network information system interface 420. The network information may include predictions of available times, such as low usage times for relevant base stations. Using the customer parameters and network information, estimate engine 430 may provide an initial assessment of whether a FOTA campaign with the proposed parameters is viable.

If the campaign parameters are not viable (block 630—Yes), process 600 may return to process block 620 to receive updated FOTA campaign parameters. For example, FOTA campaign portal 170 may provide a message to the user indicating the current parameters are not supported. According to an implementation, FOTA campaign portal 170 may use user interface 500 to identify particular parameters that are in conflict or that are not attainable by the network.

If the campaign parameters are viable (block 630—Yes), process 600 may include generating a campaign estimate based on the FOTA campaign parameters and network information (block 640). For example, if viable, estimate engine 430 may assemble a pricing estimate for the FOTA campaign based on the customer's selections and current or projected network capacity. In one implementation, the pricing estimate may be weighted to account for requests that include competition for FOTA resources from other customers or use during high-demand periods. In another implementation, generating a campaign estimate may include prioritizing and/or auctioning of network resources among multiple customers. According to an exemplary embodiment, the estimate engine 430 includes a bidding platform for negotiating FOTA opportunities. For example, in response to a customer submitting FOTA campaign parameters, the bidding platform initiates a bidding process, which may include pitting the FOTA campaign parameters against other FOTA campaigns with conflicting parameters in an auction for participating FOTA campaign customers. According to an exemplary embodiment, the bidding may be performed according to a machine-to-machine architecture, in which each machine, on behalf of each party, negotiates FOTA campaign parameters that will be used over an available network resource period. When the bidding results in an agreement being reached, the estimate engine 430 may provide the parameter for the winning bid to FOTA reservation system 440 and/or FOTA campaign manager 460.

Process 600 may further include presenting the estimate on the user interface (block 650), temporarily reserving resources for the FOTA campaign (block 660), and determining if an order is placed (block 670). For example, Estimate engine 430 may forward the estimate to FOTA campaign portal 170 for presentation in user interface 500. In one implementation, FOTA orchestrator 180 may mark/reserve network resources for the FOTA campaign pending a decision by the user. For example, FOTA campaign portal 170 may give a user a three-minute time period to either confirm an order or modify the campaign parameters. FOTA campaign portal 170 may detect if a user selects initiate campaign button 522 (e.g., within the confirmation period) to initiate a FOTA campaign.

If an order is not placed (block 670—No), process 600 may return to process block 620 to receive updated FOTA campaign parameters. If an order is placed (block 670—Yes), process 600 may include confirming UE device IDs and a FOTA upgrade file size (block 680), and scheduling and conducting the FOTA campaign (block 690). For example, a user's selection of initiate campaign button 522 may cause FOTA campaign portal 170 to submit a FOTA campaign order to FOTA orchestrator 180. FOTA campaign portal 170 may prompt a user to select UE device identifiers for specific UE devices 110 targeted in the campaign. Additionally, FOTA campaign portal 170 may provide an interface for the user to upload the FOTA upgrade file(s) required for the campaign. According to an implementation, FOTA campaign portal 170 and/or FOTA orchestrator 180 may confirm the number of UE device identifiers and that the FOTA upgrade file size is consistent with the values provided in user interface 500 (e.g., fields 504 and 506). Once the UE device list and FOTA upgrade file size are confirmed, FOTA orchestrator 180 may provide the FOTA upgrade file to FOTA update system 150. FOTA orchestrator 180 may signal UE devices 110 to request a FOTA update within the scheduled periods. FOTA update system 150 may provide the update to UE device 110 in response to UE device 110 sending a message to FOTA update system 150 requesting the update.

Systems and methods described herein provide managed OTA updates based on service level agreements. A computer device receives user parameters for an OTA update campaign, such as a FOTA campaign. The parameters include a number of user equipment (UE) devices to receive an OTA update, a device type to receive the OTA update, a file size of an OTA update file, and a service level for the OTA update campaign. The computer device generates an estimate for conducting the OTA update campaign based on the user parameters and predicted network conditions, provides the estimate to a user, and receives an order for conducting the OTA update campaign using the user parameters. The order includes identifiers for the UE devices and the OTA update file. The computer device generates, based on the order, a schedule to perform the OTA update on the UE devices in accordance with the service level agreement, and instructs the UE devices to perform the OTA update based on the schedule.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method performed by a computer device, the method comprising:
   receiving, by the computer device, user parameters for an Over-The-Air (OTA) update campaign, wherein the user parameters include:
      a number of user equipment (UE) devices that are to receive an OTA update,
      a device type to receive the OTA update,
      a file size of an OTA update file, and
      a service level for the OTA update campaign;
   generating, by the computer device, an estimate for conducting the OTA update campaign based on the user parameters and predicted network conditions;
   providing, by the computer device, the estimate to a user,
   receiving, by the computer device, a request for conducting the OTA update campaign using the user parameters, wherein receiving the request further includes receiving identifiers for the UE devices and the OTA update file;
   generating, by the computer device and based on the request, a schedule to perform the OTA update on the UE devices in accordance with the service level; and
   instructing, by the computer device, the UE devices to perform the OTA update based on the schedule.

2. The method of claim 1, wherein the OTA update campaign includes a Firmware OTA (FOTA) update campaign and wherein the OTA update includes a FOTA update.

3. The method of claim 1, wherein the service level indicates one or more of:
   a time period for completing the OTA update campaign, or
   a geographic region for the OTA update campaign.

4. The method of claim 1, wherein the service level includes:
   a priority level for a quality of service guarantee.

5. The method of claim 1, further comprising:
   determining, by the computer device, if the OTA update campaign with the user parameters is viable.

6. The method of claim 1, further comprising:
   reserving, by the computer device, network resources for the OTA update campaign based on the estimate; and
   releasing the reserved network resources when the computer device determines that the request responsive to the estimate is not placed.

7. The method of claim 1, further comprising:
   receiving, by the computer device and after providing the estimate, revised user parameters for the OTA update campaign; and
   generating, by the computer device, a revised estimate for conducting the OTA update campaign based on the revised user parameters and the predicted network conditions.

8. The method of claim 1, wherein generating the estimate for conducting the OTA update campaign comprises:
   initiating an automatic bidding process, among customers of OTA campaigns, that includes displaying parameters indicating competition for network resources.

9. The method of claim 1, wherein the UE devices include:
   a Category M (Cat-M) Internet of Things (IoT) device, or
   a Narrow Band IoT (NB-IoT) device.

10. A computer device comprising:
    a processor configured to:
       receive user parameters for an Over-The-Air (OTA) update campaign, wherein the user parameters include:
          a number of user equipment (UE) devices to receive an OTA update,
          a device type to receive the OTA update,
          a file size of an OTA update file, and
          a service level for the OTA update campaign;
       generate an estimate for conducting the OTA update campaign based on the user parameters and predicted network conditions;
       provide the estimate to a user,
       receive a request for conducting the OTA update campaign using the user parameters, wherein when the processor receives the request, the processor is further configured to receive identifiers for the UE devices and the OTA update file;

generate, based on the request, a schedule to perform the OTA update on the UE devices in accordance with the service level; and instruct the UE devices to perform the OTA update based on the schedule.

11. The computer device of claim 10, wherein the OTA campaign includes a Firmware OTA (FOTA) update campaign and wherein the OTA update includes a FOTA update.

12. The computer device of claim 10, wherein the service level indicates one or more of:

a time period for completing the OTA update campaign, or a geographic region for the OTA update campaign.

13. The computer device of claim 10, wherein the service level includes:

a priority level for a quality of service guarantee.

14. The computer device of claim 10, wherein the processor is further configured to:

determine if the OTA update campaign with the user parameters is viable.

15. The computer device of claim 10, wherein the processor is further configured to:

reserve network resources for the OTA update campaign based on the estimate; and release the reserved network resources when the computer device determines that the request responsive to the estimate is not placed.

16. The computer device of claim 10, wherein the processor is further configured to:

receive, after providing the estimate, revised user parameters for the OTA update campaign; and generate a revised estimate for conducting the OTA update campaign based on the revised user parameters and predicted network conditions.

17. The computer device of claim 10, wherein, when generating the estimate for conducting the OTA update campaign, the processor is further configured to:

initiate an automatic bidding process among customers of OTA campaigns that includes displaying parameters indicating competition for network resources.

18. A non-transitory computer-readable memory device storing instructions executable by a processor, the non-transitory computer-readable memory device comprising one or more instructions to:

receive user parameters for an Over-The-Air (OTA) update campaign, wherein the user parameters include:

a number of user equipment (UE) devices to receive an OTA update, a device type to receive the OTA update, a file size of an OTA update file, and a service level for the OTA update campaign;

generate an estimate for conducting the OTA update campaign based on the user parameters and predicted network conditions;

provide the estimate to a user;

receive a request for conducting the OTA update campaign using the user parameters, wherein receiving the request further includes receiving identifiers for the UE devices and the OTA update file;

generate, based on the request, a schedule to perform the OTA update on the UE devices; and instruct the UE devices to perform the OTA update based on the schedule.

19. The non-transitory computer-readable memory device of claim 18, wherein the service level identifies one or more of:

a time period for completing of the OTA update campaign, a geographic region for the OTA update campaign, and a priority level associated with a quality of service guarantee.

20. The non-transitory computer-readable memory device of claim 18, further comprising one or more instructions to:

receive, after providing the estimate, revised user parameters for the OTA update campaign; and generate a revised estimate for conducting the OTA update campaign based on the revised user parameters and predicted network conditions.

* * * * *